Oct. 15, 1968         M. S. FRANT ETAL         3,406,102
        ION-SENSITIVE ELECTRODE WITH ORGANO-METALLIC
                   LIQUID ION-EXCHANGER
                   Filed April 7, 1965
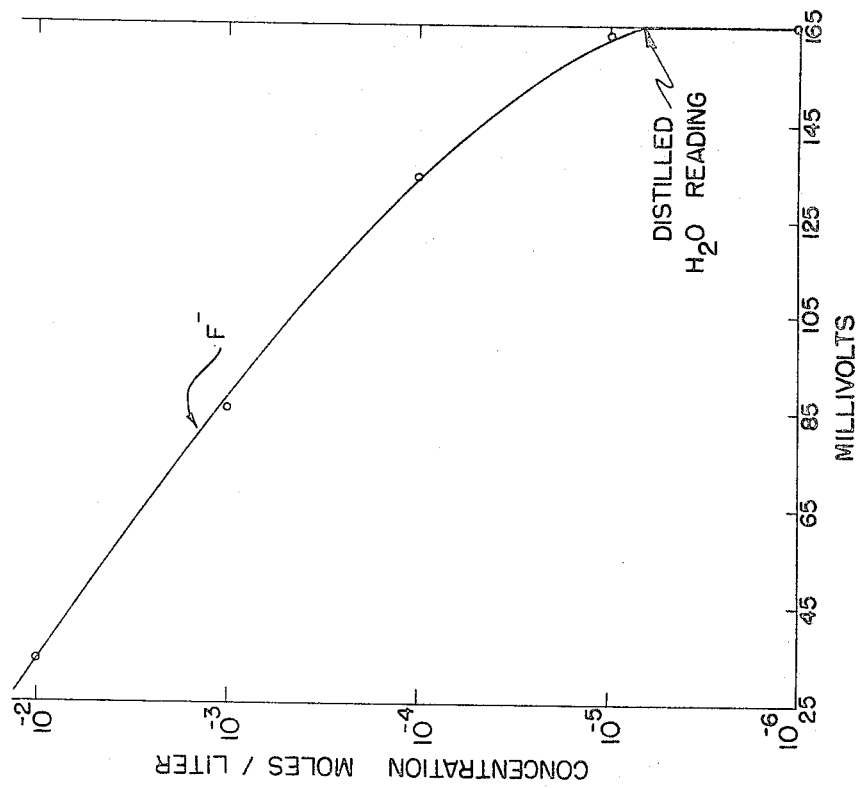
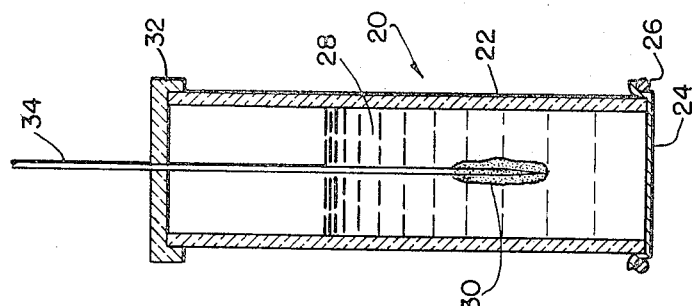
INVENTORS
MARTIN S. FRANT
BY JAMES W. ROSS, JR.
*Robert J. Schiller*
ATTORNEY

United States Patent Office 3,406,102
Patented Oct. 15, 1968

---

3,406,102
ION-SENSITIVE ELECTRODE WITH ORGANO-METALLIC LIQUID ION-EXCHANGER
Martin S. Frant and James W. Ross, Jr., Newton, Mass., assignors to Corning Glass Works, Corning, N.Y., a corporation of New York
Filed Apr. 7, 1965, Ser. No. 446,312
14 Claims. (Cl. 204—1)

The present invention relates to measurement of the concentration of ionic species in solution, and more particularly to methods for determining the activity of specific ionic species and novel electrodes for use in such determination.

Copending United States application. Ser. No. 390,016 filed Aug. 17, 1964, by James W. Ross, disclosed electrometric methods and apparatus for determining concentrations of ionic species in solution, particularly employing a novel electrode assembly. This assembly, hereinafter termed an exchanger-electrode, broadly incorporates an ion-sensitive barrier comprising a continuous liquid phase including an organic ion-exchanger dissolved in or mixed with an organic solvent, and in contact therewith, a reference electrode, such as an electrically conductive solid, having a steady or fixed contact potential with respect to the continuous liquid phase. Typically, the ion-exchange material dissolved or mixed with the organic solvent may be a solid such as the well known quaternary ammonium salts, sulfonates, phosphates, and the like or a liquid per se such as certain organophosphoric acids, perfluorocarboxylic acids, and the like.

While such electrodes have been useful, particularly in measuring concentrations of polyvalent ions in aqueous solution, they exhibit small specificities. For example, although an electrode using di-2-ethylhexyl phosphoric acid as an exchanger shows marked selectivity or preference for divalent over monovalent cations, it does not appear to show specificity i.e., a differential response with respect to various cations of the same charge, for example between divalent ions such as magnesium and calcium ions.

The present invention therefore has as its principal object the provision ofan exchanger-electrode having improved specificity.

Another object is to achieve such improved specificity through the use of organo-metallic compounds as ion-exchange materials in the exchanger-electrodes.

To effect the foregoing and other objects appearing hereinafter, the present invention contemplates electrometric determinations employing electrodes which comprise barrier means across which, responsively to an ionic species, it is intended to develop the requisite potential, such barrier means comprising, in continuous phase, an ion-exchanger liquid including an organo-metallic ion-exchanger material. Liquid ion-exchange, as the concept and variations of the phrase are used herein, is intended to refer to a liquid system that apparently operates by interchange of ions at an interface between a first liquid, for example, an aqueous solution, and a second liquid, such as an organic solvent which is substantially immiscible with the first, there being negligible distribution of the first and the second liquid phases in one another. The interchange or ion-exchange is believed to depend upon an extraction process involving a methathetical reaction between the ions in the exemplary aqueous phase and ion-exchanger material in the solvent, which latter can be considered as the extractant phase. The extraction system of an ion-exchanger liquid, whether the latter is a liquid ion-exchanger per se or an organic solvent having ion-exchanger material dissolved therein, can be distinguished from other extraction systems such as extraction system by neutral reagents such as ethers, esters, phosphine oxide, and by extraction using solid ion-exchangers, for example, as beds or columns. The latter are readily distinguishable inasmuch as when used with aqueous solutions they are highly hydrated and generally exhibit low selectivities as exchangers when so hydrated. On the other hand, ion-exchanger liquids, as generally contemplated by the present invention, and liquid ion-exchangers specifically, are substantially anhydrous, and are fully operative in this condition.

The terms, "liquid," "solid," "immiscible," and the like, which are used herein with reference to physical properties of materials, are to be understood as referring to such properties as they exist under substantially normal conditions, such as room temperatures and atmospheric pressures. For example, the term "solid" then refers to a state wherein, under the foregoing normal conditions, the elements of a matrix or lattice structure exhibit spatial orientation which is substantially static or fixed over ordinary time periods during which the property of solidity is significant or required.

The term "selectivity" as used herein is intended to refer to the capability of an ion-exchanger material to exchange its labile ions with ions of a particular charge polarity. The term "specificity" is intended to refer to the capability of an ion-exchange material to distinguish between different ionic species of the same charge polarity or, indeed, different species of the same total charge.

Other objects of the invention will in part be obvious and will in part appear hereinafter. The invention accordingly comprises the processes involving the several steps and the relation and order of one or more of such steps with respect to each of the others, and the apparatus and compositions possessing the features, properties and relation of elements which are exemplified in the following detailed description taken in connection with the accompanying drawings wherein:

FIG. 1 is a diagrammatic cross sectional representation of an exemplary electrode formed according to the principles of the present invention; and FIG. 2 is an exemplary plot of the response of an electrode of the present invention to dilute concentrations of fluoride ions in aqueous solution.

The present invention is intended to provide method and means for determining electrometrically the concentration of ions in solution, and involves as an essential part thereof the use of an ion-sensitive electrode in an electrometric cell having the following generalized formula:

(1) Electrode(s); organo-metallic ion-exchanger(1)/ solution under test/bridge; ref. electrode As the electrode in contact with the ion-exchanger liquid and thereby forming the ion-sensitive electrode assembly, a number of known structures can be employed. However, it is preferred, out of consideration of the stability of contact potential, to use the well-known Ag-AgCl electrode. As the reference electrode and bridge, either a standard calomel-type or Ag-AgCl type assembly is appropriate.

A large number of organo-metallic ion-exchange materials can be used both of the anionic and cationic type. The ion-exchange material can be liquid per se under normal conditions or can be a normally solid material, which when dissolved in an appropriate solvent, exhibit ion-exchange properties.

The exchanger materials preferred in one important aspect of the invention are characterized in possessing the property of being highly soluble (and thus, where applicable, highly miscible) in a first solvent, and substantially insoluble in the second solvent which is the solution under test in Formula 1 above. Typically, where the solution under test is aqueous, the exchanger material selected possesses an organic group or groups (alkyl, aryl, aralkyl or the like) of sufficient size (preferably a chain of four or more carbon atoms) or nature so as to provide a comparatively massive ion which is relatively soluble in an organic solvent, but exhibits substantial insolubility in the aqueous solution.

The class of ion-exchangers useful in the present invention are generally organo-metallic radicals coupled to exchangable ions and characterized in having a general formula:

(2) $(B_aM)_m \cdot B_n$ in which B is an exchangeable ion, either a cation or anion, i.e. is sufficiently labile to confer exchangeability on the compound; M is a metal or metalloid having a formal oxidation state of 2 or more; R is an organic group covalently bonded to M; $a$ is an integer greater than or less than the formal oxidation state of M; the bonding between the parenthetical radical ($R_aM$) and the ion, B, being at least partially ionic or electrostatic; and $n$ and $m$ are integers respectively determined by the charge states of ($R_aM$) and B.

The class is further characterized in that not only are they generally insoluble in water, but the carbon-to-metal bonds are stable, i.e. do not readily undergo cleavage due to light, or by oxygen at normal temperature and pressures, or in aqueous solution between pH 4 and pH 9.5, e.g. less than 1% hydrolysis over 72 hours at 37° C. in the indicated pH range. The aqueous insolubility of the exchangers in conferred by the nature of R which preferably comprises alkyl groups of four or more carbon atoms, aryl groups such as phenyl, benzyl, alkaryls such as decylbenzyl and the like.

Obviously, where $a$ is less than the formal oxidation state of M, B will be anionic and, for appropriate charge states of the organo-metallic radical, be trivalent such as a phosphate, divalent such as a sulfate, or monovalent such as a phosphate, divalent such as a sulfate, or monovalent such as a halide, hydroxide, and the like. Similarly where $a$ is greater than the formal oxidation state of M, B will be cationic e.g. potassium, hydrogen and the like.

Typically, organo-metallic compounds of the requisite stability are to be found among compounds of metals and metalloids such as mercury, arsenic, antimony, lead, tin, bismuth and boron. The use of organo-metallic compounds having either highly toxic or explosive properties is of course not recommended. Organo-metallic ion-exchangers of the class above described have been unexpectedly found to provide exchanger electrodes exhibiting high ion specificities.

The nature of the first solvent in which the exchanger (whether the latter is normally liquid or solid) is soluble is quite signficant, and its liquidity provides ready formation of a continuous phase barrier or interface.

The specificity of the ion-exchange material for a predetermined ion is believed to arise out of the nature of the sites in the exchanger which have a high affinity for that particular ion (i.e. the exchange constant of the exchanger) and also because that particular ion or the combination of ion and site has a relatively high mobility in the exchanger material. In an ion-exchanger in liquid form, whether liquid per se or by virtue of solution in a solvent, the mobility of the ion and ion site are considerably higher than will be found in the solid phase alone. The use of a solvent liquid with exchanger material provides several advantages over the direct use of a liquid ion-exchanger alone, and has functions other than merely solvent use with solid ion-exchangers. For example, by use of an appropriate mediator liquid, one can adjust the dielectric constant of the mixture thus formed, can adjust the mobility of the sites roughly in accordance with the viscosity of the mediator liquid, can adjust site density in accordance with the ratio of mediator liquid to ion-exchanger, and of course, the nature of the ion-sensitive site can be varied according to the type of ion-exchanger employed with a particular mediator liquid. The ion-exchange reaction can thus be mediated in accordance with the solvent of mediator liquid selected.

The ion-sensitive electrode assembly of the present invention, as noted in Formula 1 above, essentially includes the first solid electrode and the ion-exchange liquid. The latter, basically, forms means for providing a barrier presenting a surface for defining an interface with the solution under test, the surface being a substantially continuous phase of the ion-exchange liquid such that the ion-exchange reaction can occur at the interface. The first solid electrode, such as an Ag-AgCl electrode, is in electrical contact with the body of the barrier means either through direct physical contact or through an intermediate conductive material such as an electrolyte. In either case, of course, the solid electrode is selected, as from those known in the art, so as to provide maximum stability of the contact potentials between the solid electrode and barrier means, thereby reducing drift of potential.

Referring now to the drawings there will be seen in FIG. 1, a specific embodiment of ion-sensitive electrode 20 of the present invention and comprising electrically-insulating container means such as glass tube 22 having an opening at each end thereof. One end of tube 22 is tightly capped with a substantially chemically inert, thin (e.g. 1 mil) barrier or membrane 24 which typically can be made of such materials as cellophane, glass cloth, porous polyethylene or the like, held in place by suitable means such as O-ring 26. Disposed interiorly of tube 22 and in contact with membrane 24 is a continuous body of ion-exchanger liquid 28 which may be either a liquid organo-metallic ion-exchanger per se, or a normally liquid organo-metallic ion-exchanger diluted or attenuated with an appropriate mediator. Immersed directly in ion-exchange liquid 28 is internal reference electrode means 30, the portion thereof contacting liquid 28 preferably being a reference electrode formed of a material such as a silver-silver chloride mass which ordinarily provides a stable junction potential. The end of tube 22 opposite membrane 24 may be capped by lid 32 which acts both as a closure and as a support for electrically conductive lead 34, the latter forming a portion of electrode means 30.

The electrode of FIG. 1 is employed by contacting the outer surface of membrane 24 with the test solution. Membrane 24 provides a mechanical support which retains liquid 28 within tube 22, but the membrane, being porous, provides support for the ion-exchanger liquid while also permitting the formation of the effective ion-exchange liquid-liquid interface between the ion-exchanger liquid and the test solution.

A number of such ion-sensitive electrode assemblies were formed from different organo-metallic ion-exchanger liquids, and their behavior was determined as will be described in the following examples:

Example I

Sufficient triphenyltin chloride was dissolved in decanol to form a 10% solution by weight. The solution was inserted into and settled at one end of tube 22 of "Lexan" (a trademark for a material believed to be a thermoplastic carbonate-linked polymer produced by the reaction of bisphenol A and phosgene), capped at the one end with porous memberane 24 also made of "Lexan," the solution having been thickened with an inert material, i.e. colloidal silica, to reduce any tendency to leak through the membrane pores. An Ag-AgCl reference wire was positioned in contact with the exchanger liquid, thus completing an anion-specific electrode. This electrode assembly was employed in the usual manner in conjunction with a standard calomel reference electrode assembly to form a measuring circuit, both electrode assemblies being placed into the solutions under test. The potential difference between the electrode assemblies was measured with a very high ($>10^{14}$ ohms) input impedance millivoltmeter.

The ion-sensitive electrode was tested in a number of aqueous solutions, differing in the anion present and the concentration of the latter, with the results observed being in the following tabular form:

TABLE I

| Ion | Concentration, Molar | Reading in mv. |
|---|---|---|
| Cl— | 0.001 | 103 |
| Cl— | 0.01 | 78 |
| Cl— | 0.1 | 30 |
| Cl— | 1 | 2 |
| HCO₃— | 0.01 | 103 |
| NO₃— | 0.01 | 70 |
| SO₄= | 0.01 | 103 |
| H₂PO₄— | 0.01 | 175 |

From the foregoing data it can be inferred that the electrode is distinctly less specific to bicarbonate than to chloride, slightly more specific to nitrate than to chloride, very unresponsive to dihydrogenphosphate and about equally specific to sulfate and chloride.

When tested in a 0.01 M aqueous solution of NaF, the electrode proved very drifty apparently due to precipitation of triphenyltinfluoride in the decanol phase and, therefore, cannot be considered meaningfully responsive with respect to fluoride ions.

Example II

An anion-specific electrode assembly was formed as in Example I—however using triamyltin chloride as the organo-metallic exchanger. When tested in a manner similar to that of Example I, the results observed were as indicated in the following tabular form:

TABLE II

| Ion | Concentration, Molar | Reading in mv. |
|---|---|---|
| Cl— | 0.1 | 38 |
| Cl— | 0.01 | 91 |
| Cl— | 0.001 | 146 |
| F— | 0.1 | 18 |
| F— | 0.01 | 79 |
| F— | 0.001 | 130 |
| NO₃— | 0.01 | 92 |
| HCO₃— | 0.01 | 74 |
| SO₄= | 0.01 | 149 |
| I— | 0.01 | 38 |

A difference in potential of approximately 59 millivolts corresponds to a ten-fold difference in activity for monovalent ions. In practice, a ten-fold change in concentration does not correspond to a ten-fold change in activity, and the observed potential changes are usually less than the theoretical response, to some extent. Keeping this in mind, this data indicates that while the electrode is responsive to both Cl— and F— it is specific to F— by a factor of 2 to 3 more than to Cl—, and to I— by a factor of 10. It is somewhat more specific to HCO₃— than to Cl—, about equally specific to NO₃—, and considerably less specific to SO₄=.

A study of the response of the electrode to pH indicated relative stability to about pH 9.2, but above pH 10 the electrode was no longer functional.

Example III

An anion-specific electrode assembly was formed substantially as in Example I except that tributyltin chloride was used as the organo-metallic exchanger. An inner reference electrode formed of a narrow "Lexan" tube filled with saturated KCl-NaCl aqueous solution thickened with colloidal silica, capped with a porous membrane and having an Ag-AgCl wire dipped into the aqueous phase, was inserted into the exchanger fluid in place of a simple Ag-AgCl wire. When connected in circuit as was the electrode assembly of Example I, the following results were obtained:

TABLE III

| Ion | Concentration, molar | Reading in mv. |
|---|---|---|
| Cl— | 0.001 | 134 |
| Cl— | 0.01 | 94 |
| Cl— | 0.01 | 42 |
| Cl— | 1 | —7 |
| F— | 0.001 | 147 |
| F— | 0.01 | 91 |
| F— | 0.01 | 46 |
| F— | 1 | 5 |
| I— | 0.001 | 145 |
| I— | 0.01 | 64 |
| I— | 0.1 | 5 |
| HCO₃— | 0.001 | 170 |
| HCO₃— | 0.01 | 146 |
| NO₃— | 0.01 | 47 |
| Acetate | 0.001 | 166 |
| Acetate | 0.01 | 122 |
| Citrate | 0.01 | 106 |
| Thiosulfate | 0.01 | 15 |

After soaking for 24 hours in a 0.1 M NaCl aqueous solution, the electrode assembly was retested and provided within a reasonable margin for experimental error, the same readings as shown above for Cl—. It will be seen that this assembly shows approximately the same specificity for the halides, being slightly more responsive to iodide at high concentrations, and is relatively insensitive to bicarbonate, acetate and citrate ions. It proved quite specific to nitrate ions and showed excellent specificity to thiosulfate.

Example IV

An electrode assembly was formed as in Example III using, however, dilauryltin dichloride as the organo-metallic exchanger. Tested as before described, it showed the following results:

| Ion | Concentration, molar | Reading in mv. |
|---|---|---|
| Cl— | 0.001 | 106 |
| Cl— | 0.01 | 65 |
| Cl— | 0.01 | 26 |
| Cl— | 1 | —16 |
| HCO₃— | 0.001 | 89 |
| HCO₃— | 0.01 | 71 |
| HCO₃— | 0.1 | 28 |
| F— | 0.001 | 83 |
| F— | 0.01 | 37 |
| F— | 0.1 | 35 |

This electrode showed particular specificity for bicarbonate and fluoride ions in dilute concentrations, and the ability of the electrode to determine extremely dilute F— concentrations was therefore studied. The data, plotted in FIG. 2, show that concentrations of fluoride in aqueous solutions can be determined with accuracy to below $10^{-4}$ M, or to about 0.1 p.p.m. of fluoride ion.

Example V

A cation-specific electrode assembly was formed as described in Example I, with however the organo-metallic material being sodium tetraphenylboron and the organic solvent being n-decyl alcohol. When tested in solutions of various cations it showed a marked preference of about 100 to 1 for K+ over Na+.

A number of other organo-metallic compounds are also suitable for use and can be found in various compounds particularly of Si, Bi, Hg, Pb, Sb and the like. While there are a large number of various organo-metallics known, it should be clear that only those meeting the criteria set out above relative to stability (e.g. extent of hydrolysis of the carbon to metal bonding) are suitable. For example, organo-metallics such as the Grignard reagents (e.g. alkyl magnesium halides) cannot be used to form an electrode assembly of the present invention for the detection of ions in aqueous test solution.

Since certain changes may be made in the above process and apparatus without departing from the scope of the invention herein involved it is intended that all matter contained in the above description or shown in the accompanying drawing shall be interpreted in an illustrative and not in a limiting sense.

What is claimed is:

1. An electrode assembly sensitive to ions in solution and comprising, in combination:
   means for providing a liquid-liquid interface with said solution and including an ion-exchanger liquid comprising, an organo-metallic compound having an exchangeable ion, the carbon-to-metal bonding of said compound being substantially stable, and said compound being substantially insoluble in said solution; and
   an electrically conductive reference electrode in electrical contact with said compound at a substantially fixed contact potential with said material.

2. An electrode assembly as defined in claim 1 wherein said compound is dissolved in a liquid organic solvent substantially immiscible with said solution.

3. An electrode assembly sensitive to ions in aqueous solution, and comprising, in combination:
   means for providing a liquid-liquid interface with said solution and including an ion-exchanger liquid comprising, as an ion-exchange material, a substantially water-insoluble, non-hydrolyzable, organo-metallic ion exchanger; and
   an electrically conductive reference electrode in electrical contact with said material at a substantially fixed contact potential with said material.

4. An electrode assembly as defined in claim 3 wherein said compound is dissolved in a liquid organic solvent substantially immiscible with said solution.

5. An electrode assembly as defined in claim 3 including means for supporting said ion exchanger liquid to form said interface.

6. An electrode assembly as defined in claim 3 wherein said ion-exchanger is in a substantially liquid, continuous phase.

7. An electrode assembly sensitive to ions in solution and comprising, in combination:
   means for providing a liquid-liquid interface with said solution and including an ion-exchanger liquid comprising, as an ion-exchange material, an organo-metallic compound having the general formula $$(R_aM)_nB_n$$

wherein M is a metal having a formal oxidation state greater than 1; R is an organic group having a stable covalent bond to M; $a$ is an integer greater or less than the formal oxidation state of M; B is an exchangeable ion at least partially electrostatically bonded to the radical $(R_aM)$; and $n$ and $m$ are integers respectively determined by the charge states of said radical and said exchangeable ion; said compound being substantially insoluble in said solution; and
   an electrically conductive reference electrode in electrical contact with said material at a substantially fixed contact potential with said material.

8. An electrode assembly as defined in claim 7 wherein M is selected from the group consisting of mercury, arsenic, antimony, lead, tin, bismuth, and boron.

9. An electrode assembly sensitive to ions in solution and comprising in combination;
   means for providing a liquid-liquid interface between said solution and an ion-exchanger liquid comprising triphenyltin halide dissolved in an alcohol substantially immiscible with water; and
   an electrically conductive reference electrode in electrical contact at a substantially fixed contact potential with said liquid.

10. An electrode assembly sensitive to ions in solution and comprising in combination:
    means for providing a liquid-liquid interface between said solution and an ion-exchanger liquid comprising triamyltin halide dissolved in an alcohol substantially immiscible with water; and
    an electrically conductive reference electrode in electrical contact at a substantially fixed contact potential with said liquid.

11. An electrode assembly sensitive to ions in solution and comprising in combination:
    means for providing a liquid-liquid interface between said solution and an ion-exchanger liquid comprising tributyltin halide dissolved in an alcohol substantially immiscible with water; and
    an electrically conductive reference electrode in electrical contact at a substantially fixed contact potential with said liquid.

12. An electrode assembly sensitive to ions in solution and comprising in combination:
    means for providing a liquid-liquid interface between said solution and an ion-exchanger liquid comprising dilauryltin dihalide dissolved in an alcohol substantially immiscible with water; and
    an electrically conductive reference electrode in electrical contact at a substantially fixed contact potential with said liquid.

13. An electrode assembly sensitive to ions in solution and comprising in combination:
    means for providing a liquid-liquid interface between said solution and an ion-exchanger liquid comprising alkali tetraphenylboron dissolved in an alcohol substantially immiscible with water; and
    an electrically conductive reference electrode in electrical contact at a substantially fixed contact potential with said liquid.

14. Method of determining the activity of a specific ionic species in aqueous solution and comprising the steps of:
    contacting said solution with a body of ion-exchanger liquid substantially insoluble in said solution, said liquid including an organo-metallic compound having an ion exchangeable with said species, the carbon-to-metal bonding of said compound being substantially stable;
    electrically contacting said ion-exchanger liquid with a reference electrode exhibiting a substantially fixed contact potential with respect to said liquid;
    electrically contacting said solution with another reference electrode exhibiting a substantially fixed contact potential with respect to said solution;
    electrically connecting said reference electrodes to a potentiometric device;
    measuring the potential developed across the interface between said solution and said liquid.

References Cited

UNITED STATES PATENTS 2,913,386  11/1959  Clark _____ 204—195

OTHER REFERENCES

"Journal of the Am. Chem. Soc.," vol. 86, May 5, 1964, pp. 1901–1902.

Lewis et al.: "Journal of the Electrochemical Soc.," vol. 106, No. 4, April 1959, pp. 347–354.

HOWARD S. WILLIAMS, *Primary Examiner.*

T. TUNG, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,406,102                                                    October 15, 1968

Martin S. Frant et al.

It is certified that error appears in the above identified patent and that said Letters Patent are hereby corrected as shown below:

Column 3, line 9, "$(BaM)_m \cdot Bn$" should read -- $(RaM)_m \cdot Bn$ --.

Signed and sealed this 31st day of March 1970.

(SEAL)
Attest:

Edward M. Fletcher, Jr.                                    WILLIAM E. SCHUYLER, JR.
Attesting Officer                                                 Commissioner of Patents